(12) United States Patent
Flynn et al.

(10) Patent No.: US 9,790,869 B2
(45) Date of Patent: Oct. 17, 2017

(54) METHOD AND SYSTEMS FOR A MULTI-FUEL ENGINE

(71) Applicant: General Electric Company, Schenectady, NY (US)

(72) Inventors: Paul Lloyd Flynn, Lawrence Park, PA (US); Ganesha Koggu Naik, Bangalore (IN); Thomas Michael Lavertu, Clifton Park, NY (US); Victor Manuel Salazar, Clifton Park, NY (US); Jeffrey David Willis, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 146 days.

(21) Appl. No.: 14/669,058

(22) Filed: Mar. 26, 2015

(65) Prior Publication Data

US 2016/0281615 A1 Sep. 29, 2016

(51) Int. Cl.
*F02B 13/00* (2006.01)
*F02D 19/06* (2006.01)
*F02D 41/00* (2006.01)
*F02D 13/02* (2006.01)
(Continued)

(52) U.S. Cl.
CPC ..... *F02D 19/0642* (2013.01); *F02D 41/0002* (2013.01); *F02D 41/0025* (2013.01); *F02D 13/0234* (2013.01); *F02D 13/0269* (2013.01); *F02D 19/0647* (2013.01); *F02D 19/0673* (2013.01); *F02D 19/08* (2013.01); *F02D 35/025* (2013.01); *F02D 41/0027* (2013.01); *F02D 2041/001* (2013.01); *F02D 2200/0414* (2013.01); *F02D 2200/101* (2013.01); *F02D 2200/1002* (2013.01); *F02D 2200/703* (2013.01); *Y02T 10/142* (2013.01); *Y02T 10/18* (2013.01); *Y02T 10/36* (2013.01); *Y02T 10/42* (2013.01)

(58) Field of Classification Search
CPC ............. F02D 41/0025; F02D 41/0027; F02D 19/0642; F02D 19/0673
USPC ........................................................ 123/575
See application file for complete search history.

(56) References Cited

U.S. PATENT DOCUMENTS 5,597,020 A * 1/1997 Miller ..................... F17C 5/007
141/18
6,321,715 B1 * 11/2001 Dong ....................... F01L 3/06
123/295

(Continued)

*Primary Examiner* — Jacob Amick
*Assistant Examiner* — Charles Brauch
(74) *Attorney, Agent, or Firm* — Global Patent Operation; John A. Kramer

(57) ABSTRACT

Various methods and systems are provided for a multi-fuel capable engine. In one example, a system comprises an engine having at least one cylinder controlled via an intake valve, a first fuel system to deliver liquid fuel and a second fuel system to deliver gaseous fuel to the at least one cylinder, a variable valve timing actuation system to adjust one or more of an opening or a closing timing of the intake valve, and a controller. The controller is configured to, during a liquid fuel only mode, adjust the variable valve timing actuation system to close the intake valve at a first timing based at least on engine load, and during a multi-fuel mode, adjust the variable valve timing actuation system to close the intake valve at a second timing.

20 Claims, 8 Drawing Sheets

(51) Int. Cl.
*F02D 19/08* (2006.01)
*F02D 35/02* (2006.01)

(56) References Cited

U.S. PATENT DOCUMENTS

| | | | |
|---|---|---|---|
| 7,546,834 B1* | 6/2009 | Ulrey | F02D 19/0628 |
| | | | 123/525 |
| 2007/0235011 A1* | 10/2007 | Easley | F02B 47/08 |
| | | | 123/568.13 |
| 2008/0103676 A1* | 5/2008 | Ancimer | F02D 19/10 |
| | | | 701/103 |
| 2011/0146269 A1* | 6/2011 | Hepburn | F01N 3/021 |
| | | | 60/602 |
| 2012/0316756 A1* | 12/2012 | Tsuyuki | F02D 35/023 |
| | | | 701/104 |
| 2013/0152901 A1* | 6/2013 | Shishime | F02D 13/02 |
| | | | 123/48 R |
| 2013/0220274 A1 | 8/2013 | Deshpande et al. | |
| 2013/0306029 A1* | 11/2013 | Stockner | F02M 21/0245 |
| | | | 123/445 |
| 2013/0311066 A1* | 11/2013 | Guimaraes | F02D 41/3094 |
| | | | 701/104 |
| 2014/0069386 A1 | 3/2014 | Coldren et al. | |

* cited by examiner

METHOD AND SYSTEMS FOR A MULTI-FUEL ENGINE

BACKGROUND

Technical Field

Embodiments of the subject matter disclosed herein relate to an engine system.

Discussion of Art

In light of its favorable energy content, natural gas may be used as a fuel source for an engine. However, many existing engines are typically configured with only a single, liquid (e.g., diesel) fuel supply, limiting the opportunities for operating engines with natural gas. When engines are configured to operate with both liquid and gaseous fuel, a trade-off may be made between an optimal compression ratio for liquid versus gaseous fuel operation. For example, a high compression ratio may be preferred for liquid fuel engines in order to provide reliable starting, low power ignition, and high efficiency. In contrast, a lower compression ratio may be preferred for gaseous fuel engines to prevent pre-ignition and allow a high percentage of gaseous fuel substitution at high power levels.

BRIEF DESCRIPTION

In one embodiment, a system comprises an engine having at least one cylinder controlled via an intake valve, a first fuel system to deliver liquid fuel to the at least one cylinder, a second fuel system to deliver gaseous fuel to the at least one cylinder, a variable valve timing actuation system to adjust one or more of an opening or a closing timing of the intake valve, and a controller. The controller is configured to, during a liquid fuel only mode where only liquid fuel is delivered to the at least one cylinder, adjust the variable valve timing actuation system to close the intake valve at a first timing based at least on engine load. The controller is further configured to, during a multi-fuel mode where both liquid fuel and gaseous fuel are delivered to the at least one cylinder, adjust the variable valve timing actuation system to close the intake valve at a second timing.

DETAILED DESCRIPTION

The following description relates to embodiments of adjusting intake valve closing timing in an engine configured to operate with liquid fuel only (e.g., diesel fuel only) and with both liquid fuel and gaseous fuel (e.g., diesel and natural gas). During operation with only liquid fuel, the intake valve closing timing may be adjusted based on engine load in order to increase engine efficiency and decrease fuel consumption and emissions at both high and low loads. During operation with both liquid fuel and gaseous fuel, the intake valve closing timing may be adjusted to a timing that may be different than the timing during liquid fuel only operation. For example, during the multi-fuel mode, an earlier timing may be used to reduce compressed gas temperatures and enable operation at higher gaseous fuel rates.

Figure 1:
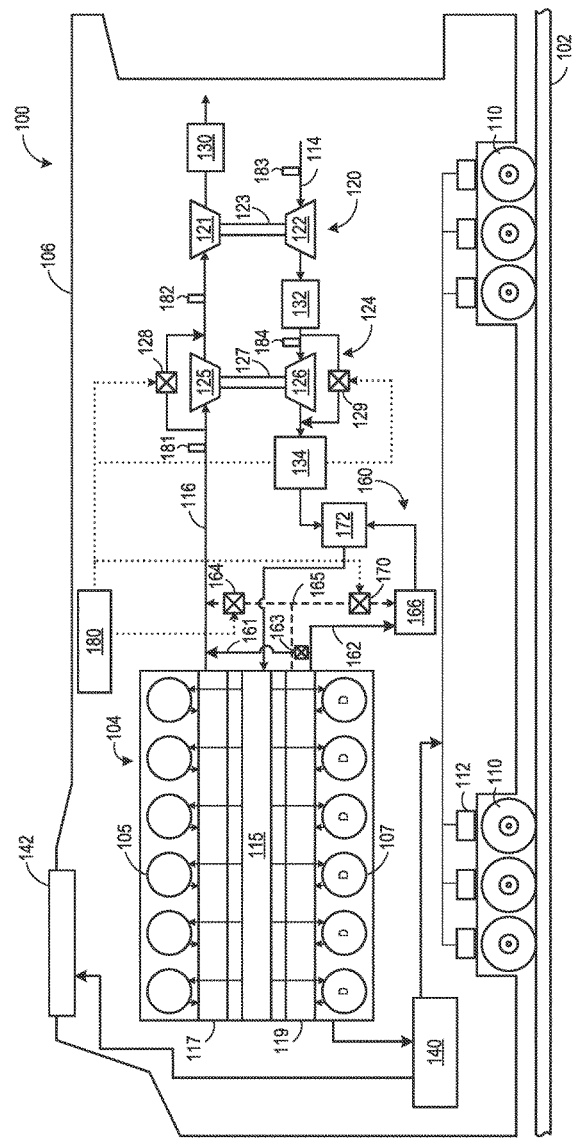
FIG. 1 shows a schematic diagram of an embodiment of a rail vehicle with an engine.
Figure 2:
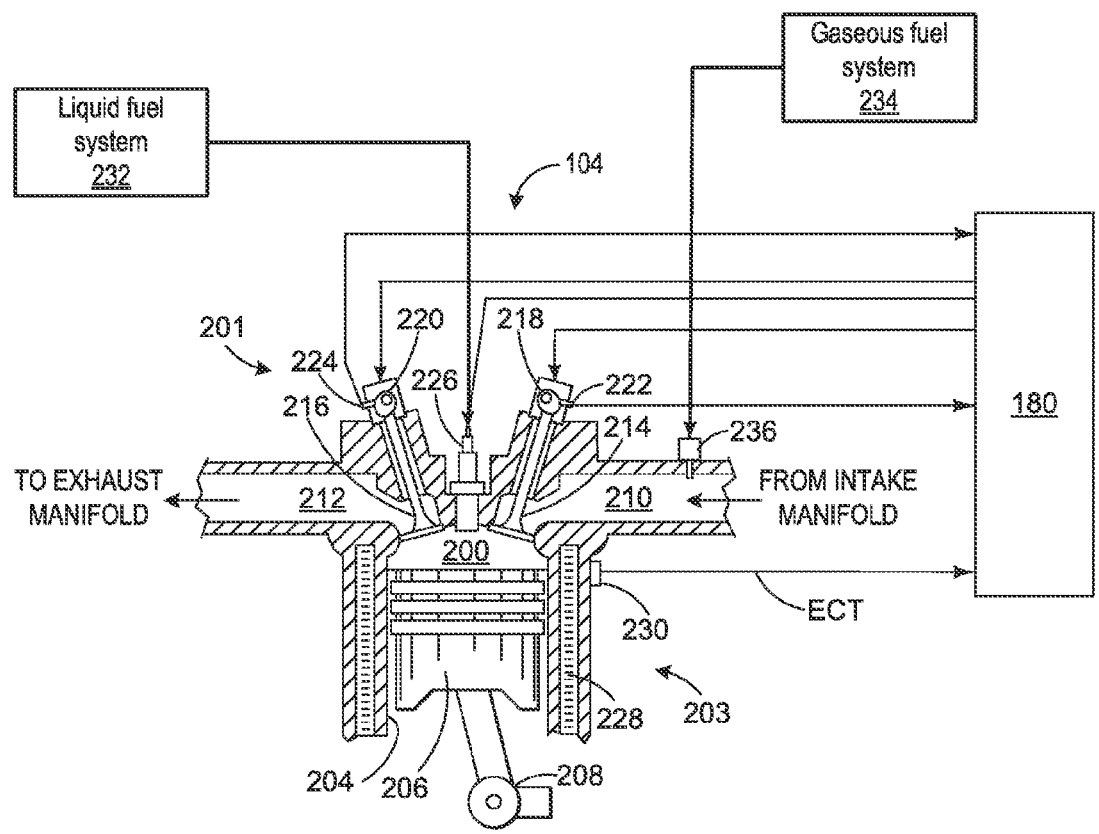
FIG. 2 shows a schematic diagram of a cylinder of the engine of FIG. 1.
Figure 3:
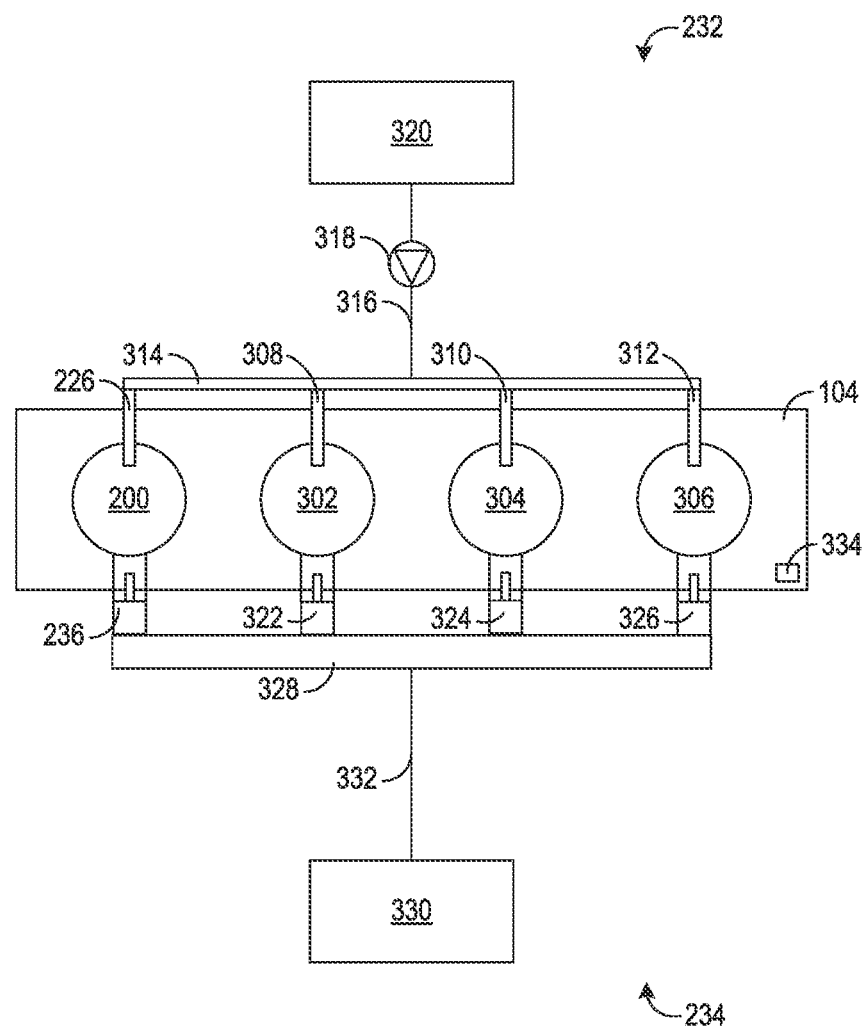
FIG. 3 shows a schematic diagram of an engine system including the engine of FIG. 1.

The multi-fuel capable engine described above may be utilized as the prime mover of a vehicle, such as the rail vehicle depicted in FIG. 1, and may be part of an engine system, as depicted in FIGS. 2-3. The engine system may include a controller configured to carry out one or more methods, such as the methods illustrated in FIGS. 4-7. During execution of one or more of the methods of FIGS. 4-7, the multi-fuel capable engine may operate according to the parameters illustrated in FIGS. 8-9.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for adjusting an effective compression ratio in a multi-fuel engine, an example of a platform is disclosed in which an engine may be configured for a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle includes an engine 104. In other non-limiting embodiments, the engine may be a stationary engine, such as in a power-plant application, or an engine in a marine vessel or off-highway vehicle propulsion system as noted above.

The engine receives intake air for combustion from an intake, such as an intake manifold 115. The intake may be any suitable conduit or conduits through which gases flow to enter the engine. For example, the intake may include the intake manifold, the intake passage 114, and the like. The intake passage receives ambient air from an air filter (not shown) that filters air from outside of a vehicle in which the engine may be positioned. Exhaust gas resulting from combustion in the engine is supplied to an exhaust, such as exhaust passage 116. The exhaust may be any suitable conduit through which gases flow from the engine. For example, the exhaust may include an exhaust manifold 117, the exhaust passage, and the like. Exhaust gas flows through the exhaust passage, and out of an exhaust stack of the rail vehicle.

In one example, the engine is a diesel engine that combusts air and diesel fuel through compression ignition. As such, the engine may include a plurality of fuel injectors to inject fuel to each cylinder of the engine. For example, each cylinder may include a direct injector that receives fuel from a high-pressure fuel rail. In other non-limiting embodiments, the engine may combust fuel including gasoline, kerosene, biodiesel, or other petroleum distillates of similar density through compression ignition (and/or spark ignition). In a still further example, the engine may combust gaseous fuel, such as natural gas. The gaseous fuel may be ignited via compression ignition of injected diesel fuel, herein referred to as multi-fuel operation, or the gaseous fuel may be ignited via spark ignition. The gaseous fuel may be supplied to the cylinders via one or more gas admission valves, for example. In further examples, the fuel may be supplied to the cylinders via port injection. The liquid fuel (e.g., diesel) may be stored in a fuel tank located on board the rail vehicle. The gaseous fuel may be stored in a storage tank located on board the rail vehicle or on board a different vehicle operably coupled to the rail vehicle.

In one embodiment, the rail vehicle is a diesel-electric vehicle (or diesel/gaseous fuel-electric hybrid). As depicted in FIG. 1, the engine is coupled to an electric power generation system, which includes an alternator/generator 140 and electric traction motors 112. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of traction motors. As depicted, the plurality of traction motors are each connected to one of a plurality of wheels 110 to provide tractive power to propel the rail vehicle. One example configuration includes one traction motor per wheel. As depicted herein, six fraction motors correspond to each of six pairs of wheels of the rail vehicle. In another example, alternator/generator may be coupled to one or more resistive grids 142. The resistive grids may be configured to dissipate excess engine torque via heat produced by the grids from electricity generated by alternator/generator.

In the embodiment depicted in FIG. 1, the engine is a V-12 engine having twelve cylinders. In other examples, the engine may be a V-6, V-8, V-10, V-16, I-4, I-6, I-8, opposed 4, or another engine type. As depicted, the engine includes a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders.

As depicted in FIG. 1, the non-donor cylinders are coupled to the exhaust passage to route exhaust gas from the engine to atmosphere (after it passes through an exhaust gas treatment system 130 and first and second turbochargers 120 and 124). The donor cylinders, which provide engine exhaust gas recirculation (EGR), are coupled exclusively to an EGR passage 162 of an EGR system 160 which routes exhaust gas from the donor cylinders to the intake passage of the engine, and not to atmosphere. By introducing cooled exhaust gas to the engine, the amount of available oxygen for combustion is decreased, thereby reducing combustion flame temperatures and reducing the formation of nitrogen oxides (e.g., $NO_x$).

Exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an example, one or more charge air coolers 132 and 134 disposed in the intake passage (e.g., upstream of where the recirculated exhaust gas enters) may be adjusted to further increase cooling of the charge air such that a mixture temperature of charge air and exhaust gas is maintained at a desired temperature. In other examples, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

Additionally, in some embodiments, the EGR system may include an EGR bypass passage 161 that is configured to divert exhaust from the donor cylinders back to the exhaust passage. The EGR bypass passage may be controlled via a valve 163. The valve may be configured with a plurality of restriction points such that a variable amount of exhaust is routed to the exhaust, in order to provide a variable amount of EGR to the intake.

In an alternate embodiment shown in FIG. 1, the donor cylinders may be coupled to an alternate EGR passage 165 (illustrated by the dashed lines) that is configured to selectively route exhaust to the intake or to the exhaust passage. For example, when a second valve 170 is open, exhaust may be routed from the donor cylinders to the EGR cooler and/or additional elements prior to being routed to the intake passage. Further, the alternate EGR system includes a first valve 164 disposed between the exhaust passage and the alternate EGR passage.

The first valve and second valve may be on/off valves controlled by the control unit 180 (for turning the flow of EGR on or off), or they may control a variable amount of EGR, for example. In some examples, the first valve may be actuated such that an EGR amount is reduced (exhaust gas flows from the EGR passage to the exhaust passage). In other examples, the first valve may be actuated such that the EGR amount is increased (e.g., exhaust gas flows from the exhaust passage to the EGR passage). In some embodiments, the alternate EGR system may include a plurality of EGR valves or other flow control elements to control the amount of EGR.

In such a configuration, the first valve is operable to route exhaust from the donor cylinders to the exhaust passage of the engine and the second valve is operable to route exhaust from the donor cylinders to the intake passage of the engine. As such, the first valve may be referred to as an EGR bypass valve, while the second valve may be referred to as an EGR metering valve. In the embodiment shown in FIG. 1, the first valve and the second valve may be engine oil, or hydraulically, actuated valves, for example, with a shuttle valve (not shown) to modulate the engine oil. In some examples, the valves may be actuated such that one of the first and second valves are normally open and the other is normally closed. In other examples, the first and second valves may be pneumatic valves, electric valves, or another suitable valve.

As shown in FIG. 1, the vehicle system further includes an EGR mixer 172 which mixes the recirculated exhaust gas with charge air such that the exhaust gas may be evenly distributed within the charge air and exhaust gas mixture. In the embodiment depicted in FIG. 1, the EGR system is a high-pressure EGR system which routes exhaust gas from a location upstream of turbochargers 120 and 124 in the exhaust passage to a location downstream of the turbochargers in the intake passage. In other embodiments, the vehicle system may additionally or alternatively include a low-pressure EGR system which routes exhaust gas from downstream of the turbochargers in the exhaust passage to a location upstream of the turbochargers in the intake passage.

As depicted in FIG. 1, the vehicle system further includes a two-stage turbocharger with the first turbocharger 120 and the second turbocharger 124 arranged in series, each of the turbochargers arranged between the intake passage and the exhaust passage. The two-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 which drives a first compressor 122. The first turbine and the first compressor are mechanically coupled via a first shaft 123. The first turbocharger may be referred to the "low-pressure stage" of the turbocharger. The second turbocharger operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 1, the second turbocharger is provided with a turbine bypass valve 128 which allows exhaust gas to bypass the second turbocharger. The turbine bypass valve may be opened, for example, to divert the exhaust gas flow away from the second turbine. In this manner, the rotating speed of the compressor, and thus the boost provided by the turbochargers to the engine may be regulated during steady state conditions. Additionally, the first turbocharger may also be provided with a turbine bypass valve. In other embodiments, only the first turbocharger may be provided with a turbine bypass valve, or only the second turbocharger may be provided with a turbine bypass valve. Additionally, the second turbocharger may be provided with a compressor bypass valve 129, which allows gas to bypass the second compressor to avoid compressor surge, for example. In some embodiments, first turbocharger may also be provided with a compressor bypass valve, while in other embodiments, only first turbocharger may be provided with a compressor bypass valve.

The vehicle system 100 optionally includes an exhaust treatment system 130 coupled in the exhaust passage in order to reduce regulated emissions. As depicted in FIG. 1, the exhaust gas treatment system 130 is disposed downstream of the turbine 121 of the first (low pressure) turbocharger 120. In other embodiments, an exhaust gas treatment system may be additionally or alternatively disposed upstream of the first turbocharger 120. The exhaust gas treatment system 130 may include one or more components. For example, the exhaust gas treatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The vehicle system further includes the control unit 180 (also referred to as a controller), which is provided and configured to control various components related to the vehicle system. In one example, the control unit includes a computer control system. The control unit further includes non-transitory, computer readable storage media (not shown) including code for enabling on-board monitoring and control of engine operation. The control unit, while overseeing control and management of the vehicle system 100, may be configured to receive signals from a variety of engine sensors, as further elaborated herein, in order to determine operating parameters and operating conditions, and correspondingly adjust various engine actuators to control operation of the vehicle system. For example, the control unit may receive signals from various engine sensors including sensor 181 arranged in the inlet of the high-pressure turbine, sensor 182 arranged in the inlet of the low-pressure turbine, sensor 183 arranged in the inlet of the low-pressure compressor, and sensor 184 arranged in the inlet of the high-pressure compressor. The sensors arranged in the inlets of the turbochargers may detect air temperature and/or pressure. Additional sensors may include, but are not limited to, engine speed, engine load, boost pressure, ambient pressure, intake manifold temperature, exhaust temperature, exhaust pressure, etc. Correspondingly, the control unit may control the vehicle system by sending commands to various components such as traction motors, alternator, cylinder valves, throttle, heat exchangers, wastegates or other valves or flow control elements, etc. For example, the controller may control the timing and/or duration of liquid fuel injection, and/or the timing and/or duration of gaseous fuel supply, as described below. Other actuators may be coupled to various locations in the rail vehicle.

FIG. 2 depicts an embodiment of a combustion chamber, or cylinder 200, of a multi-cylinder internal combustion engine, such as the engine 104 described above with reference to FIG. 1. Cylinder 200 may be defined by a cylinder head 201, housing the intake and exhaust valves and liquid fuel injector, described below, and a cylinder block 203.

The engine may be controlled at least partially by a control system including controller 180 which may be in further communication with a vehicle system, such as the vehicle system 100 described above with reference to FIG. 1. As described above, the controller 180 may further receive signals from various engine sensors including, but not limited to, engine speed, engine load, boost pressure, exhaust pressure, ambient pressure, $CO_2$ levels, exhaust temperature, $NO_x$ emission, engine coolant temperature (ECT) from temperature sensor 230 coupled to cooling sleeve 228, etc. Correspondingly, the controller 180 may control the vehicle system by sending commands to various components such as alternator, cylinder valves, throttle, fuel injectors, etc.

The cylinder (i.e., combustion chamber) 200 may include cylinder liner 204 with a piston 206 positioned therein. The piston 206 may be coupled to a crankshaft 208 so that reciprocating motion of the piston is translated into rotational motion of the crankshaft. In some embodiments, the engine may be a four-stroke engine in which each of the cylinders fires in a firing order during two revolutions of the crankshaft 208. In other embodiments, the engine may be a two-stroke engine in which each of the cylinders fires in a firing order during one revolution of the crankshaft 208.

The cylinder 200 receives intake air for combustion from an intake including an intake passage 210. The intake passage 210 receives intake air via an intake manifold. The intake passage 210 may communicate with other cylinders of the engine in addition to the cylinder 200, for example, or the intake passage 210 may communicate exclusively with the cylinder 200.

Exhaust gas resulting from combustion in the engine is supplied to an exhaust including an exhaust passage 212. Exhaust gas flows through the exhaust passage 212, to a turbocharger in some embodiments (not shown in FIG. 2) and to atmosphere, via an exhaust manifold. The exhaust passage 212 may further receive exhaust gases from other cylinders of the engine in addition to the cylinder 200, for example.

Each cylinder of the engine may include one or more intake valves and one or more exhaust valves. For example, the cylinder 200 is shown including at least one intake poppet valve 214 and at least one exhaust poppet valve 216 located in an upper region of cylinder 200. In some embodiments, each cylinder of the engine, including cylinder 200, may include at least two intake poppet valves and at least two exhaust poppet valves located at the cylinder head.

The intake valve 214 may be controlled by the controller 180 via an actuator 218. Similarly, the exhaust valve 216 may be controlled by the controller 180 via an actuator 220. During some conditions, the controller 180 may vary the signals provided to the actuators 218 and 220 to control the opening and closing of the respective intake and exhaust valves. The position of the intake valve 214 and the exhaust valve 216 may be determined by respective valve position sensors 222 and 224, respectively, and/or by cam position sensors. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

In some embodiments, each cylinder of the engine may be configured with one or more fuel injectors for providing fuel thereto. As a non-limiting example, FIG. 2 shows the cylinder 200 is including a fuel injector 226. The fuel injector 226 is shown coupled directly to the cylinder 200 for injecting fuel directly therein. In this manner, fuel injector 226 provides what is known as direct injection of a fuel into combustion cylinder 200. The fuel may be delivered to the fuel injector 226 from a first, liquid fuel system 232, including a fuel tank, fuel pumps, and a fuel rail (described in more detail with respect to FIG. 3). In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition).

Further, each cylinder of the engine may be configured to receive gaseous fuel (e.g., natural gas) alternative to or in addition to diesel fuel. The gaseous fuel may be provided to cylinder 200 via the intake manifold, as explained below. As shown in FIG. 2, the intake passage 210 may receive a supply of gaseous fuel from a second, gaseous fuel system 234, via one or more gaseous fuel lines, pumps, pressure regulators, etc., located upstream of the cylinder. In some embodiments, gaseous fuel system 234 may be located remotely from engine 104, such as on a different vehicle (e.g., on a fuel tender car), and the gaseous fuel may be supplied to the engine 104 via one or more fuel lines that traverse the separate cars. However, in other embodiments gaseous fuel system 234 may be located on the same vehicle as engine 104.

A plurality of gas admission valves, such as gas admission valve 236, may be configured to supply gaseous fuel from gaseous fuel system 234 to each respective cylinder via respective intake passages. For example, a degree and/or duration of opening of gas admission valve 236 may be adjusted to regulate an amount of gaseous fuel provided to the cylinder. As such, each respective cylinder may be provided with gaseous fuel from an individual gas admission valve, allowing for individual cylinder control in the amount of gaseous fuel provided to the cylinders. However, in some embodiments, a single-point fumigation system may be used, where gaseous fuel is mixed with intake air at a single point upstream of the cylinders. In such a configuration, each cylinder may be provided with substantially similar amounts of gaseous fuel. To regulate the amount of gaseous fuel provided by the single-point fumigation system, in some examples a gaseous fuel control valve may be positioned at a junction between a gaseous fuel supply line and the engine intake air supply line or intake manifold. The gaseous fuel control valve degree and/or duration of opening may be adjusted to regulate the amount of gaseous fuel admitted to the cylinders. In other examples, the amount of gaseous fuel admitted to the cylinders in the single-point fumigation system may be regulated by another mechanism, such as control of a gaseous fuel regulator, via control of a gaseous fuel pump, etc.

FIG. 3 illustrates multiple cylinders of engine 104, including cylinder 200, cylinder 302, cylinder 304, and cylinder 306. While four cylinders arranged in-line are illustrated in FIG. 3, such an arrangement is non-limiting, and other engine configurations are possible. For example, engine 104 may be a V-6, V-8, V-12, V-16, I-6, I-8, or other engine type. Engine 104 may be supplied one or more of liquid fuel from liquid fuel system 232 and gaseous fuel from gaseous fuel system 234. As such, each cylinder of engine 104 includes a liquid fuel injector, including injector 226 as well as injectors 308, 310, and 312. Each liquid fuel injector is supplied with liquid fuel from a common fuel rail 314. Common fuel rail 314 may be supplied with fuel from liquid fuel tank 320 via supply line 316. The fuel may be provided at a high pressure via one or more fuel pumps, such as pump 318. The liquid fuel in liquid fuel system 232 may be diesel fuel or another liquid fuel, such as gasoline, alcohol, etc. Further, while a common fuel rail system is illustrated in FIG. 3, a non-common rail unit pump injection system may be used.

Each cylinder of engine 104 may similarly include a gas admission valve to supply gaseous fuel, including gas admission valve 236 as well as gas admission valves 322, 324, and 326. Each gas admission valve may be positioned in an intake passage of a respective cylinder, or other suitable location. The gas admission valves may be supplied gaseous fuel, such as natural gas, from a gaseous fuel passage 328. The gaseous fuel passage 328 may receive gaseous fuel from a gaseous fuel tank 330 via a supply line 332. As explained previously, gaseous fuel tank 330 may be located remotely from engine 104. However, in some embodiments, the individual gas admission valves may be dispensed with, and all the cylinders may be supplied with the same gaseous fuel/intake air mixture from an upstream single-point fumigation system.

Each liquid fuel injector of each cylinder, as well as each gas admission valve of each cylinder, may be individually controlled by a controller (such as controller 180) to enable individual cylinder control of the fuel supply. Accordingly, each cylinder may be operated with varying levels of liquid fuel and/or gaseous fuel. In some embodiments, the liquid fuel injectors may be controlled by a different controller than the controller that controls the gas admission valves. Further, in a gaseous fumigation system, rather than controlling the individual gas admission valves, a single gaseous fuel control valve or other gaseous fuel control element may be controlled by the controller to regulate the amount of gaseous fuel admitted to the cylinders.

In an example, a mixture of gaseous fuel and air may be provided to cylinder 200 via intake passage 210 and, in some embodiments, gas admission valve 236. Then, during compression, diesel fuel may be injected to cylinder 200 via fuel injector 226. The diesel fuel may be ignited via compression ignition and subsequently ignite the gaseous fuel.

During a standard combustion event in a multi-fuel engine, the compression ignition of the liquid (e.g., diesel) fuel initiates combustion of a mixture of air and fuel (such as gaseous fuel), causing a combustion flame front to develop that spreads across the cylinder consuming unburned fuel/air mix. The flame front typically moves away from the site of ignition and across the combustion chamber. However, under certain conditions a second flame front may develop away from the first flame front. The second flame front may occur after the liquid fuel combustion initiates combustion of the gaseous fuel/air mixture and results from compressing and heating of the unburned gaseous fuel/air mixture ahead of the flame front to a high enough level that the end gas mixture auto-ignites ahead of the flame front. If the first flame front meets the second flame front, cylinder vibrations may occur that can result in engine damage. Further, the auto-ignition of end gases may degrade emissions.

To detect the presence of auto-ignition in one or more cylinders of engine 104, one or more auto-ignition sensors 334 may be present. The auto-ignition sensor may be configured to detect vibrations to the engine caused by auto-ignition. As such, the auto-ignition sensor may include an accelerometer or other motion sensor, a microphone or other acoustic sensor, a laser, and/or other sensor. To detect auto-ignition on an individual cylinder level, each cylinder may include an auto-ignition sensor. In other examples, one auto-ignition sensor may be used, and the cylinder(s) undergoing auto-ignition may be identified based on correlation to cylinder firing order/engine position.

Engines configured to operate with both liquid and gaseous fuel may be operated with as much gaseous fuel as possible while still maintaining requested engine power. For example, in standard liquid-fueled engines, such as diesel engines, 100% of produced engine power may be derived from combustion of diesel fuel. In multi-fuel engines, a portion of the engine power may be derived from gaseous fuel while the remaining engine power may be derived from liquid fuel. For example, as much as 80% of produced engine power may be derived from combustion of gaseous fuel, with the remaining 20% of power derived from the combustion of diesel fuel. The amount of gaseous fuel "substituted" for the liquid fuel may be referred to as the substitution ratio. The substitution ratio may reflect the portion of engine power derived from gaseous fuel. For example, a substitution ratio of 80 indicates 80% of the power is derived from gaseous fuel, while a substitution ratio of 50 indicates 50% of the power is derived from gaseous fuel. A substitution ratio of 0 indicates liquid fuel only operation.

Figure 4:
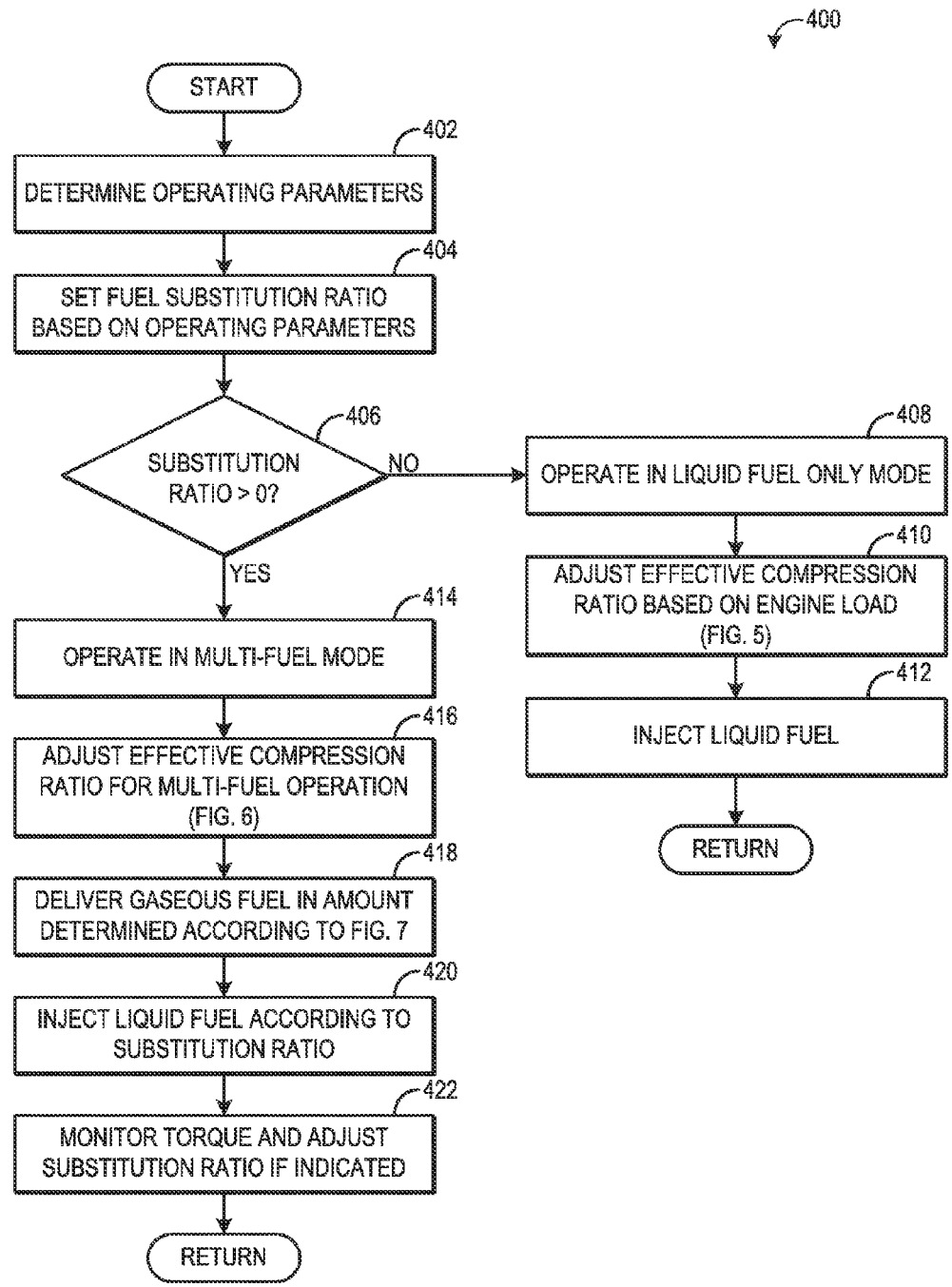
FIG. 4 is a high level flow chart illustrating a method for operating a multi-fuel engine.

FIG. 4 is a flow chart illustrating a method 400 for controlling a multi-fuel engine configured to operate with one or more of liquid and gaseous fuel, such as engine 104 of FIGS. 1-3. Method 400 may be carried out according to non-transitory instructions stored in the memory of a control system, such as controller 180. At 402, method 400 includes determining engine operating parameters. The determined engine operating parameters may include engine speed, engine load, current fuel substitution ratio, relative fuel levels in each fuel tank, etc. At 404, method 400 includes setting a fuel substitution ratio based on the operating parameters. The substitution ratio may be set based on engine temperature, desired fuel type, engine load (as determined by throttle position in some examples), relative fuel levels in each fuel tank (e.g., if the level of gaseous fuel is below a threshold, more liquid fuel may be used), vehicle location (e.g., whether the vehicle is in a tunnel), and/or other parameters. At 406, the gaseous and/or liquid fuel is supplied to each cylinder of the engine at the set substitution ratio. In some examples, the set substitution ratio may be the same for all cylinders. In other examples, one or more cylinders may have different substitution ratios.

At 406, method 400 determines if the set substitution ratio (for at least one cylinder of the engine) is greater than zero. If the substitution ratio is not greater than zero, method 400 proceeds to 408 to operate in liquid fuel only mode. In the liquid fuel only mode, only liquid fuel (and not gaseous fuel) is delivered to the cylinders. In one example, the liquid fuel only mode may be carried out when engine load is relatively low (e.g., during idle) and also when engine load is relatively high (e.g., during an acceleration event).

During operation in the liquid fuel only mode, the effective compression ratio of the engine may be adjusted based on engine load in order to optimize the volumetric efficiency of the engine for low or high power, as indicated at 410. Additional details regarding adjusting the effective compression ratio of the engine during liquid fuel only operation are presented below with respect to FIG. 5. At 412, method 400 includes injecting liquid fuel in an amount to meet requested engine output. Method 400 then returns.

Returning to 406, if it is determined that at least one cylinder of the engine is operating with a substitution ratio greater than zero, method 400 proceeds to 414 to operate in the multi-fuel mode where at least some engine power is derived from gaseous fuel in addition to liquid fuel. During operation in the multi-fuel mode, the effective compression ratio of the engine may be adjusted, as indicated at 416. In some examples, the effective compression ratio adjustment performed during the multi-fuel mode may be different than the effective compression ratio adjustment performed during the liquid fuel only mode. Additional details regarding adjusting the effective compression ratio during the multi-fuel mode will be presented below with respect to FIG. 6.

At 418, the gaseous fuel is delivered to the engine in an amount determined according to the method presented below with respect to FIG. 7. Briefly, based on the substitution ratio and requested engine power output/torque, an amount of gaseous fuel to be delivered to each cylinder may be calculated. This calculation may be performed differentially based on the quantity of fuel to be delivered.

At 420, liquid fuel is injected in an amount and/or timing according to the substitution ratio. The injected liquid fuel ignites the gaseous fuel-air mix present in the cylinders in order to initiate combustion. At 422, the torque output may be monitored and the substitution ratio may be adjusted if indicated. For example, the torque output may be monitored according to a suitable mechanism, such as crankshaft acceleration, engine temperature, alternator load, etc. If the torque output deviates from an expected output (e.g., is more than 10% higher or lower than expected), it may indicate that the amount of delivered gaseous fuel is inaccurate, and thus the substitution ratio may be adjusted to bring the torque output to the desired output. Alternatively or in addition to monitoring the torque output, the amount of auto-ignition may be monitored based on feedback from the auto-ignition sensor, and if auto-ignition is detected, the substitution ratio may be adjusted (e.g., lowered). Method 400 then returns.

Figure 5:
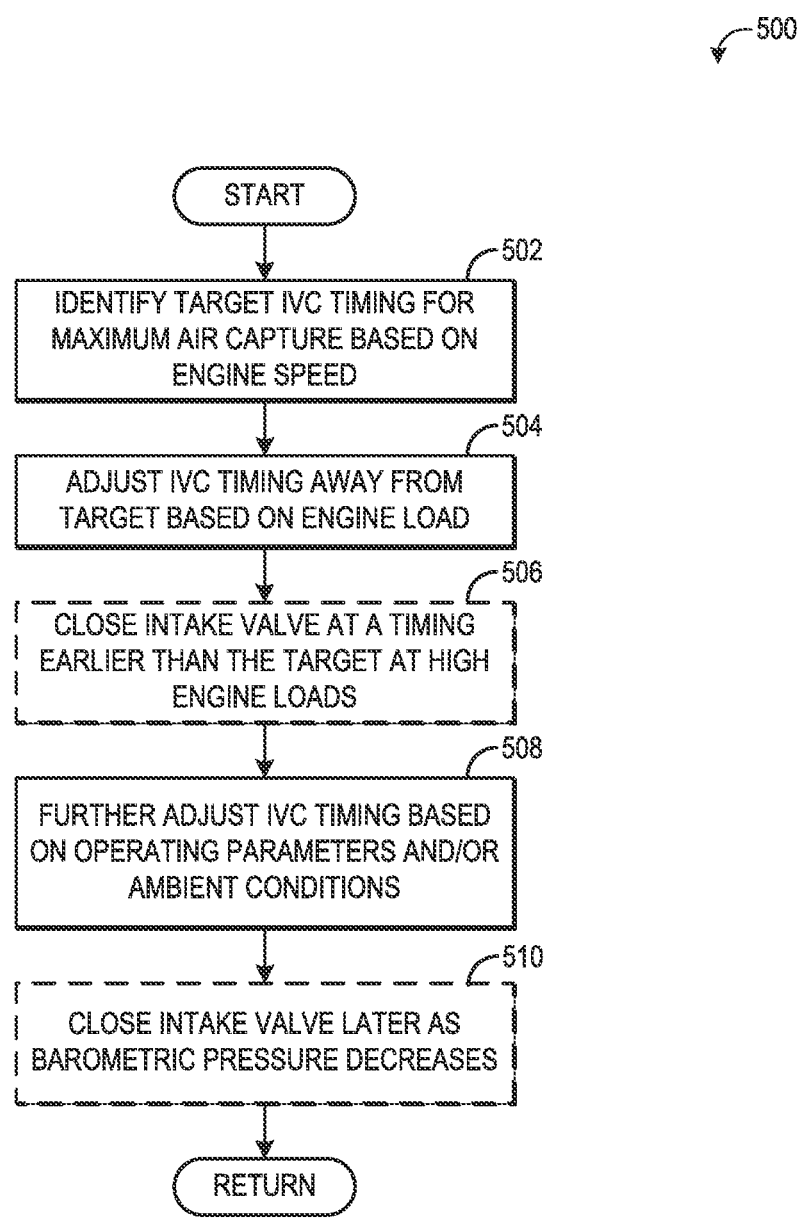
FIGS. 5-6 are flow charts illustrating methods for adjusting a compression ratio in a multi-fuel engine.

Turning to FIG. 5, a method 500 for adjusting the effective compression ratio based on engine load during liquid fuel only operation is presented. Method 500 may be carried out according to non-transitory instructions stored in the memory of a control system, such as controller 180. In some examples, method 500 may be executed as part of method 400, described above, in response to an indication to operate in liquid fuel only mode. Method 500 includes adjusting the effective compression ratio of at least one cylinder of the engine by adjusting the intake valve closing timing of the at least one cylinder. The compression ratio of a reciprocating engine is defined by the maximum volume of a combustion chamber divided by the minimum volume. The geometric compression ratio is defined by the basic geometry of the crankshaft, connecting rod, piston and block. Thus, while the geometry of the engine cannot be easily adjusted during operation, the amount of intake air actually captured during operation may be adjusted to affect the effective compression ratio. For example, by closing an intake valve earlier in a combustion cycle, less intake air may be inducted into the cylinder, thus lowering the effective compression ratio. As will be explained in more detail below, the effective compression ratio may be changed based on engine load to optimize fuel consumption and emission levels across all areas of the engine speed-load map.

At 502, method 500 includes identifying a target intake valve closing (IVC) timing for maximum air capture based on engine speed. The intake valve closing timing for maximum air capture is typically around bottom dead center (BDC) at the end of the intake stoke (which may correlate to 540° C.A in a combustion cycle that begins at TDC of the power stroke). However, the actual intake valve closing timing for maximum air capture may vary based on engine speed. For example, at low engine speeds, such as 500 rpm, the IVC timing for maximum air capture may be slightly later than BDC, such as at 550° C.A, while at high engine speeds (such as 1500-1800 rpm), the IVC for maximum air capture may be much later than BDC, such as 580° C.A. At moderate engine speeds, such as around 1000 rpm, the IVC for maximum air capture may be around 560° C.A. It is to be understood that the above IVC timings for maximum air capture are exemplary and non-limiting, and that other IVC timings are within the scope of this disclosure.

At 504, method 500 includes adjusting the IVC timing away from the target based on engine load. In one example, during high engine load (such as at engine loads higher than 90% of maximum load), the intake valves may be closed earlier than the target timing, as indicated at 506. By closing the intake valves early, the volumetric efficiency of the engine is reduced. This allows for operation at high EGR levels, high airflow, and early injection timing, resulting in low fuel consumption. Further, by reducing the amount of intake air captured during high loads, exhaust flow through the high pressure turbine may be maintained, increasing engine efficiency. The early intake valve closing timing performed during high load, liquid fuel only operation may be a suitable timing earlier than the target for maximum air capture, such as 520° C.A or earlier.

In another example, at low loads (such as at engine loads less than 40% of maximum load), the intake valves may be closed at a later timing, such as to operate at a higher volumetric efficiency and maintain operation at a low emissions level. The later IVC timing may be later than the earlier timing during high load and may be earlier than the target IVC timing for maximum air capture, equal to the target IVC timing for maximum air capture, or later than the target IVC timing for maximum air capture.

The intake valve closing timing may be adjusted by a variable valve timing actuation system that may include, but is not limited to, devices that index the camshaft rotation, hydraulically open the intake valves, hydraulically delay the intake valve closures, shift the contact point of the cam follower on the cam shaft, or other suitable mechanism. Further, in some examples the valve timing profile may be maintained, such that the valve lift, timing of maximum valve lift relative to the closing timing, etc., are the same even as the intake valve timing changes, or the profile may also be adjusted to adjust maximum valve lift or other parameters.

At 508, the IVC timing may be further adjusted based on operating parameters and/or ambient conditions. In one example, indicated at 510, the intake valves may be closed at a later timing as barometric pressure decreases (e.g., as altitude increases) to improve the volumetric efficiency of the engine and meet emissions regulations. Other operating parameters that may be sensed include peak cylinder pressure, exhaust gas temperature, and intake and/or exhaust oxygen level, while other ambient conditions that may be sensed include temperature and humidity, and the intake valve closing timing may be adjusted based on any one or more of these to give optimum engine performance. In another example, as peak cylinder pressure increases, IVC timing may be adjusted so that the intake valves are closed at an earlier timing.

Thus, method 500 of FIG. 5 provides for adjusting the intake valve closing timing during liquid fuel only operation based on engine speed, engine load, and/or ambient conditions or other operating parameters to maintain the optimal compression ratio for low fuel consumption and low emissions while still delivering desired engine output.

Figure 6:
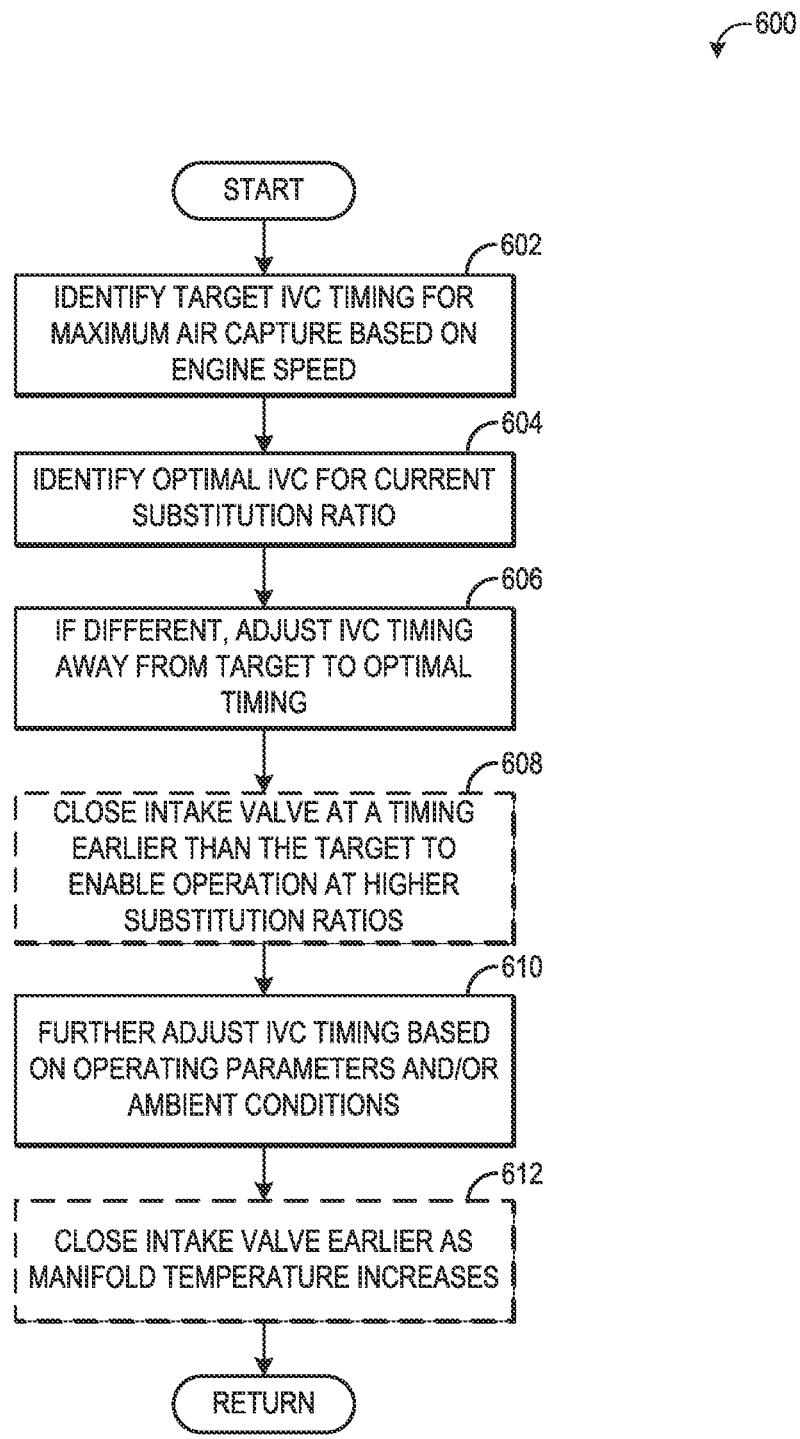

FIG. 6 illustrates a method 600 for adjusting the effective compression ratio based during multi-fuel operation. Method 600 may be carried out according to non-transitory instructions stored in the memory of a control system, such as controller 180. In some examples, method 600 may be executed as part of method 400, described above, in response to an indication to operate in multi-fuel mode. Method 600 includes adjusting the effective compression ratio by adjusting the intake valve closing timing, similar to method 500 above. As will be explained in more detail below, the effective compression ratio may be changed during operation with both liquid and gaseous fuel to increase the amount of gaseous fuel that is combusted (e.g., increase the substitution ratio) during certain conditions where the substitution ratio may be otherwise limited.

At 602, method 600 includes identifying a target intake valve closing (IVC) timing for maximum air capture based on engine speed, similar to the target IVC timing for maximum air capture described above with respect to FIG. 5. At 604, method 600 includes identifying an optimal IVC timing for the current substitution ratio. The optimal IVC for the substitution ratio may be earlier than the target IVC timing for maximum air capture. For example, the variable valve system can be actuated for an early intake valve closure so as to reduce the effective compression ratio and enable a high substitution ratio by reducing the compressed gas temperature. In some examples, the IVC timing may be adjusted proportionally to the substitution ratio, such that as the substitution ratio increases, the intake valves close earlier. In other examples, the IVC timing may be adjusted so that once the substitution ratio reaches a first threshold (e.g., 30), the intake valves close at a first early timing (e.g., 20° C.A before BDC), and then once the substitution ratio reaches a second, higher threshold (e.g., 80), the intake valves close at a second earlier timing (e.g., 40° C.A before BDC). In still further examples, the IVC timing may be adjusted only once the substitution ratio reaches a threshold (e.g., 80). In such examples, the IVC timing may be adjusted to a single timing optimized for high substitution ratios (e.g., 40° C.A before BDC). Other adjustments are also possible.

At 606, the IVC timing is adjusted away from the target timing to the optimal timing if the optimal timing for the substitution ratio is different than the target timing. Thus, in one example indicated at 608, method 600 includes closing the intake valve at a timing earlier than the target to enable operation at higher substitution ratios. Further, in some examples, once the IVC timing is adjusted to close the intake valves at a time earlier than the target, the substitution ratio may be increased. For example, the engine may be configured to operate with a maximum substitution ratio of 80 during standard valve timing control, to avoid pre-ignition for example. Once the IVC timing is adjusted to close the intake valves earlier, the substitution ratio may be increased, for example to 85, due to the lower compressed gas temperature.

Similar to method 500 described above, the intake valve timing may be adjusted by a variable valve timing actuation system that may include, but is not limited to, devices that index the camshaft rotation, hydraulically open the intake valves, hydraulically delay the intake valve closures, shift the contact point of the cam follower on the cam shaft, or other suitable mechanism. Further, in some examples the valve timing profile may be maintained, such that the valve lift, timing of maximum valve lift relative to the closing timing, etc., are the same even as the intake valve timing changes, or the profile may also be adjusted to adjust maximum valve lift or other parameters.

Additionally, at 610, the IVC timing may be further adjusted based on operating parameters and/or ambient conditions. Operating parameters that may be sensed include engine load, peak cylinder pressure, exhaust gas temperature, and intake and/or exhaust oxygen level, while ambient conditions that may be sensed include temperature, barometric pressure, and humidity, and the intake valve closing timing may be adjusted based on any one or more of these to give optimal engine performance. In one example, indicated at 610, the intake valves may be closed at an earlier timing as intake manifold temperature increases. Further, in some examples the intake valve closing timing may be adjusted based on engine load, for example as load increases, the intake valves may be closed earlier.

Thus, method 600 of FIG. 6 provides for adjusting the intake valve closing timing during multi-fuel operation (e.g., operation with both liquid and gaseous fuel) based on engine speed, substitution ratio, and/or ambient conditions or other operating parameters to maintain a compression ratio that prevents high compressed gas temperatures, thus decreasing the likelihood of pre-ignition and enabling operation at higher substitution ratios.

Figure 8:
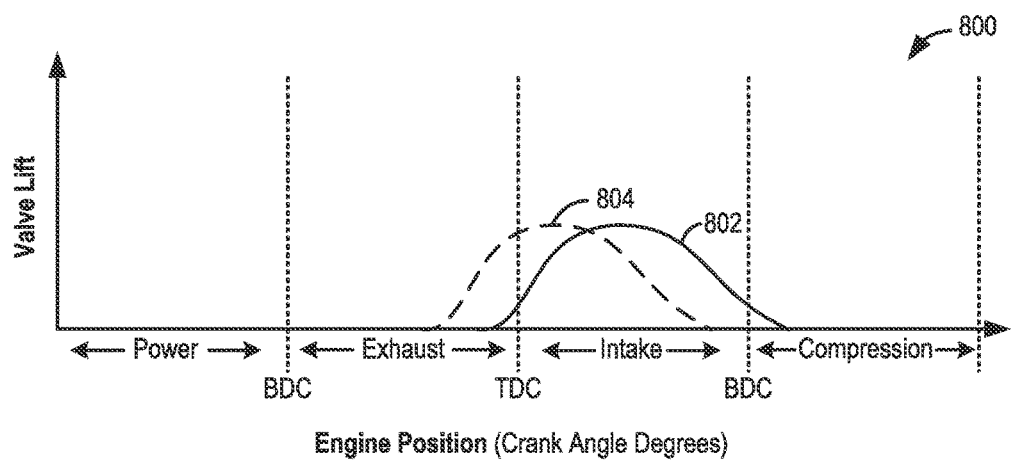
FIG. 8 is a diagram illustrating example intake valve closing timings.

In some examples, the intake valve closing timing may be earlier during multi-fuel operation than during liquid fuel only operation, while in other examples the intake valve closing timing may be later during multi-fuel operation than during liquid fuel only operation. For example, at a given engine speed and/or load point, the IVC timing may be earlier during multi-fuel operation than during liquid fuel only operation, while at a different engine speed and/or load point, the IVC timing may later during multi-fuel operation than during liquid fuel only operation. In a still further example, the IVC timing may be earlier during multi-fuel operation than during liquid fuel only operation, regardless of engine speed and/or load. Example intake closing timings that may be observed during liquid fuel only operation and during multi-fuel operation are illustrated in FIG. 8, described in more detail below.

Figure 7:
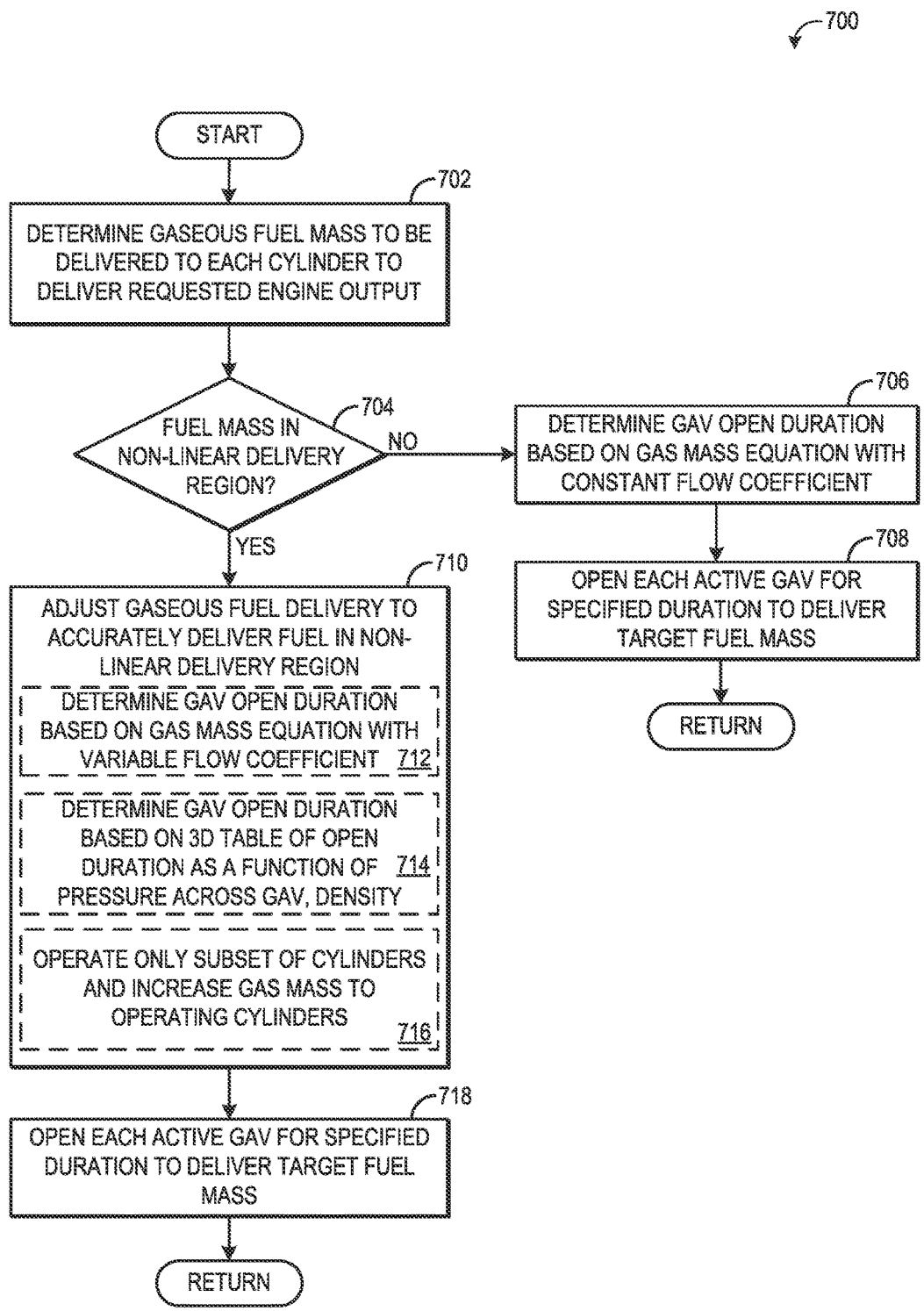
FIG. 7 is a flow chart illustrating a method for determining an amount of gaseous fuel to supply to an engine.

Now referring to FIG. 7, a method 700 for determining an amount of gaseous fuel to provide to one or more cylinders of the engine is illustrated. Method 700 may be carried out according to non-transitory instructions stored in the memory of a control system, such as controller 180. In some examples, method 700 may be executed as part of method 400, described above, in response to an indication to supply gaseous fuel during operation in the multi-fuel mode.

At 702, method 700 includes determining the gaseous fuel mass to be delivered to each cylinder to deliver the requested engine output at the set substitution ratio. At 704, method 700 determines if the fuel mass is in the non-linear delivery region for the gas admission valves. As described above with respect to FIGS. 2-3, the gaseous fuel system may include a gas rail, supply control valves, a pressure regulator, and gas admission valves. The supply control valves determine when gaseous fuel enters the separate sections of the gas rail. When the full rail is energized, the gas admission valves (GAVs) open to allow gaseous fuel to enter each cylinder that will eventually provide the power from combustion.

The flow rate of GAVs may vary greatly at small durations of activation time. These small durations of activation time may be referred to as GAV operation in the non-linear delivery operating region due to the inability of typical gas mass flow equations to predict the amount of gaseous fuel that will be admitted by the GAVs. At higher activation durations (e.g., when the GAVs are open for longer durations), the gaseous fuel may be supplied relatively linearly, and thus at higher gaseous fuel supply amounts, the GAVs may operate in a linear delivery operating region.

Due to the non-linear delivery of gaseous fuel at low gas mass/short open durations, the substitution ratio is typically limited in lower load situations. In one example, gaseous fuel is typically not utilized below a threshold throttle setting, such as a notched throttle setting of N3 or lower, or if there is less than 100 hp being generated per cylinder. To address this issue, the method 700 of FIG. 7 may perform one or more adjustments to either bring the GAVs into the linear delivery region or calculate an open duration with less variability, to allow operation at low gaseous fuel supply rates, as described in more detail below.

If it is determined at 704 that the fuel mass is not in the non-linear delivery region, method 700 proceeds to 706 to determine the GAV open duration based on a gas mass equation with a constant flow coefficient. In one example, the equation to determine the duration for which to open the GAV to deliver the specified amount of gaseous fuel may be:

$$\text{Open duration} = Z * \left(\frac{2k}{k-1}\right) * sg * P1^2 * \left(\frac{293.15}{(273.15+Tg)}\right) * \left(\left(\frac{P2}{P1}\right)^{2/k} - \left(\frac{P2}{P1}\right)^{k+1/k}\right)^{0.5}$$

In the above equation, Z is the coefficient of flow, k is the ratio of specific heat, Sg is the specific gravity of the gaseous fuel, P1 is the pressure of the gaseous fuel, P2 is the pressure of the intake manifold, and Tg is the temperature of the gaseous fuel. In the linear delivery range, the coefficient of flow is a constant value that may be based on the maximum open diameter of the gas admission valve orifice, for example.

At 708, each active GAV is opened for the duration specified by the above equation to deliver the target fuel mass. Method 700 then returns.

Returning to 704, if it is determined that the fuel mass is in the non-linear delivery region, method 700 proceeds to 710 to adjust the gaseous fuel delivery to accurately deliver fuel in the non-linear delivery region. This adjustment may include determining the GAV open duration based on the gas mass equation with a variable flow coefficient, as indicated at 712. The gas mass equation described above may be used, but with a variable coefficient of flow instead of a constant coefficient of flow. The variable coefficient of flow may be based on empirical flow data put into a 1D table or non-linear fit equation, for example.

In another example, indicated at 714, the GAV open duration may be based on a 3D table of open durations as a function of pressure across the GAV and gaseous fuel temperature and/or density. In this way, a 3D map of pressure differential across the valve, versus density, versus time may be used to determine the amount of time each active GAV is to be opened for to deliver the requested amount of gaseous fuel.

In a still further example, indicated at 716, only a subset of cylinders may be operated and each operating cylinder may receive an increased gas mass, in order to operate the GAVs of the operating cylinders in the linear delivery region. In one example where the engine has 12 cylinders, four of the cylinders may be operated per engine cycle during this operation, also referred to as skip fire operation.

At 718, each active GAV is opened for the specified duration to deliver the target fuel mass. Method 700 then returns.

FIG. 8 is a diagram 800 depicting example intake valve timing for liquid fuel only operation and multi-fuel operation. Diagram 800 includes engine position on the x axis and valve lift on the y axis. Curves 802 and 804 depict valve timings for an intake valve during liquid fuel only operation at low load (curve 802) and multi-fuel operation (curve 804). Curve 802 shows that during liquid fuel only operation at low load, the intake valve may be opened at or before the start of an intake stroke, and may remain open until a subsequent compression stroke has commenced, thus having an IVC timing of approximately 550-560° CA. In contrast, curve 804 shows that during multi-fuel mode, the intake valve may be opened before the start of the intake stroke, and may be closed prior to commencement of the compression stroke, thus having an IVC timing of approximately 500° C.A. During both the liquid fuel only operation and the multi-fuel operation, the valve profile may be the same, such that each intake valve is opened to the same amount of maximum lift and is opened for the same amount of time. However, in other examples the liquid fuel only mode may have a different valve profile than the multi-fuel operation.

Figure 9:
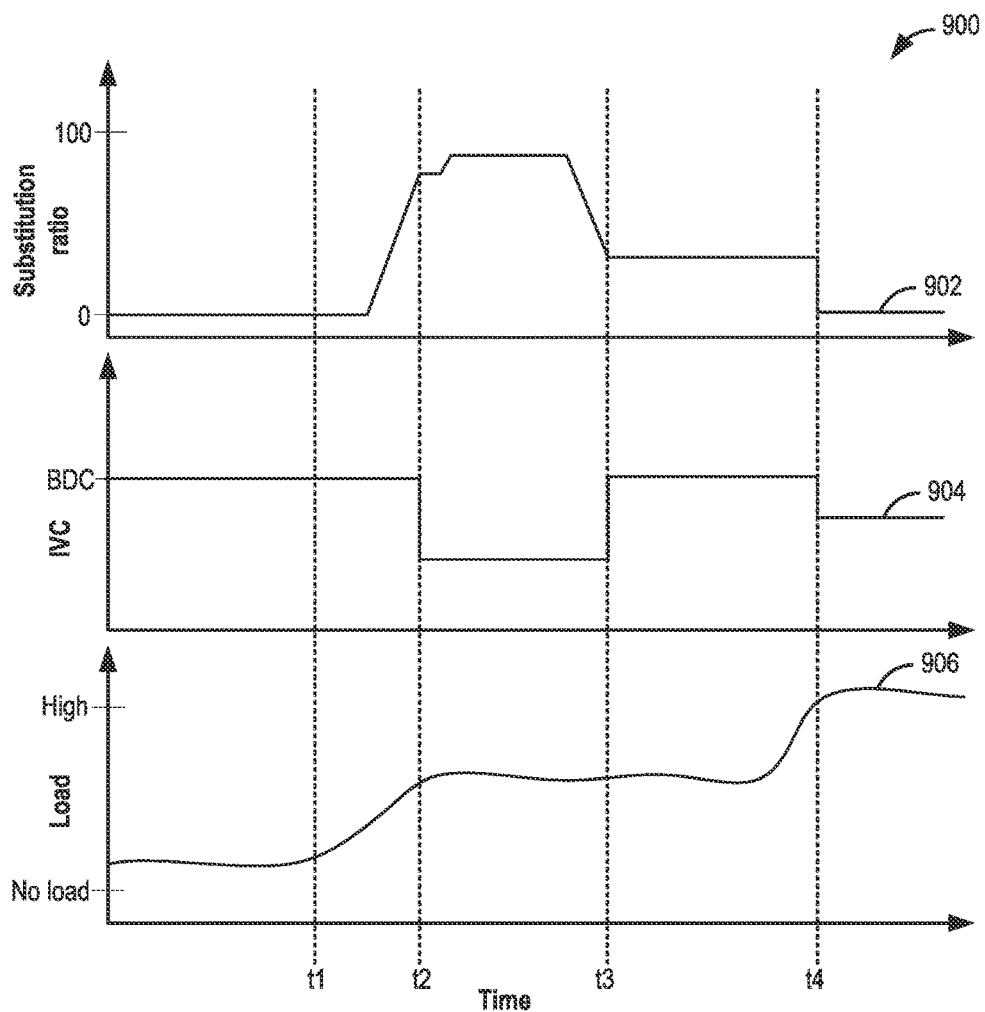
FIG. 9 is a diagram illustrating example engine operating parameters during the execution of one or more of the methods illustrated in FIGS. 4-7.

FIG. 9 is a diagram 900 showing example operating parameters during an engine operating period that includes both liquid fuel only operation and multi-fuel operation. Diagram 900 depicts time along the x (horizontal) axis and values of each respective operating parameter along the y (vertical) axis. Curve 902 illustrates the substitution ratio, curve 904 illustrates the intake valve closing timing (IVC) relative to the BDC of the end of the intake stoke, and curve 906 depicts engine load.

Prior to time t1, the engine is operating at very low load, such as at idle, shown by curve 906. As a result, the substitution ratio is at zero (e.g., liquid fuel only mode), shown by curve 902. At this load point, the engine is operated with relatively late IVC. Curve 904 shows an IVC timing of BDC (e.g., 540° C.A), but other IVC timings are within the scope of this disclosure (e.g., later than BDC). Around time t1, engine load begins to increase and as a result the substitution ratio also increases. At time t2, the substitution ratio reaches an initial set maximum substitution ratio, which in this example may be a ratio of 80. In response, the IVC is adjusted to open at a time earlier than BDC, such as at 500° C.A.

After the engine has operated at the early IVC for a duration, the substitution ratio is increased to a final set maximum substitution ratio, which in this example may be a ratio of 85. The substitution ratio is increased due to the early IVC timing, which lowers compressed gas temperatures to enable increased gaseous fuel usage. Just prior to time t3, the substitution ratio begins to decrease, even though engine load remains constant. The decrease in substitution ratio may be due to increased manifold temperature (brought on by operation in a tunnel, for example), detected auto-ignition, or other factor. At time t3, the substitution ratio has reached its new target substitution ratio, and the IVC timing is adjusted back to the original timing of BDC.

Prior to time t4, the engine load starts increasing again, and at time t4, reaches a threshold engine load. At this high engine load, the substitution ratio is returned to zero. Further, the IVC is moved to a timing earlier than BDC. This timing is earlier than the IVC timing at low load with a substitution ratio of zero, and is later than the IVC timing during the high substitution ratio operation.

An embodiment relates to a system, comprising an engine having at least one cylinder controlled via an intake valve; a first fuel system to deliver liquid fuel to the at least one cylinder; a second fuel system to deliver gaseous fuel to the at least one cylinder; a variable valve timing actuation system to adjust one or more of an opening or a closing timing of the intake valve; and a controller. The controller is configured to, during a liquid fuel only mode where only liquid fuel is delivered to the at least one cylinder, adjust the variable valve timing actuation system to close the intake valve at a first timing based at least on engine load; and during a multi-fuel mode where both liquid fuel and gaseous fuel are delivered to the at least one cylinder, adjust the variable valve timing actuation system to close the intake valve at a second timing.

In an example, the second timing is earlier than the first timing for a given engine speed and engine load point. The first timing may be further based on one or more of peak cylinder pressure, ambient pressure, ambient temperature, exhaust gas temperature, or intake oxygen concentration. To close the intake valve at the first timing based at least on engine load, the controller may be configured to close the intake valve earlier at higher engine loads and later at lower engine loads. In an example, the second timing is earlier than the first timing only at engine loads above a threshold load.

The second fuel system may comprise at least one gas admission valve to control delivery of the gaseous fuel to the at least one cylinder, and the at least one gas admission valve may have a linear delivery operating region and a non-linear delivery operating region. The controller may be further configured to, when operating in the multi-fuel mode, operate the at least one gas admission valve in the non-linear delivery operating region when engine output is less than a threshold output.

The controller may be further configured to, when operating in the multi-fuel mode with the at least one gas admission valve in the linear delivery operating region, determine an open duration for the at least one gas admission valve according to a gas mass equation in order to supply a designated amount of gaseous fuel to the at least one cylinder; and when operating in the multi-fuel mode with the at least one gas admission valve in the non-linear delivery operating region, determine an open duration for the at least one gas admission valve according to a three-dimensional table in order to supply a designated amount of gaseous fuel to the at least one cylinder, the three-dimensional table specifying the open duration for the designated amount of gaseous fuel as a function of gaseous fuel density and a pressure ratio across the at least one gas admission valve.

The controller may be further configured to when operating in the multi-fuel mode with the at least one gas admission valve in the linear delivery operating region, determine an open duration for the at least one gas admission valve according to a gas mass equation including a constant gas flow coefficient in order to supply a designated amount of gaseous fuel to the at least one cylinder; and when operating in the multi-fuel mode with the at least one gas admission valve in the non-linear delivery operating region, determine an open duration for the at least one gas admission valve according to an adjusted gas mass equation including a variable gas flow coefficient in order to supply a designated amount of gaseous fuel to the at least one cylinder.

The at least one cylinder may be one of a plurality of cylinders, each cylinder supplied with gaseous fuel via a respective gas admission valve of a plurality of gas admission valves, and the controller may be further configured to, when operating in the multi-fuel mode and when engine output is less than a threshold output, provide gaseous fuel and liquid fuel to only a subset of the plurality of cylinders to maintain each active gas admission valve in the linear delivery operating region.

An embodiment of a method for an engine having at least one cylinder comprises, during operation in a liquid fuel only mode where only liquid fuel is supplied to the at least one cylinder, adjusting an effective compression ratio of the at least one cylinder based on engine load; and responsive to operation in a multi-fuel mode where both liquid and gaseous fuel are delivered to the at least one cylinder, reducing the effective compression ratio of the at least one cylinder.

Adjusting the effective compression ratio of the at least one cylinder based on engine load during operation in the liquid fuel only mode may comprise increasing the effective compression ratio at low engine loads and decreasing the effective compression ratio at high engine loads. During the liquid fuel only mode, increasing the effective compression ratio at low engine loads and decreasing the effective compression ratio at high engine loads may comprise increasing or decreasing the effective compression ratio away from a target effective compression ratio for maximum air capture. During the multi-fuel mode, increasing the effective compression ratio may comprise increasing the effective compression ratio away from the target compression ratio. The method may further comprise, during the multi-fuel mode, further reducing the effective compression ratio if intake manifold temperature reaches a threshold temperature. The method may further comprise, during the liquid fuel only mode, further adjusting the effective compression ratio based on ambient pressure.

An embodiment of a system comprises an engine having at least one cylinder controlled via an intake valve; a first fuel system to deliver liquid fuel to the at least one cylinder; a second fuel system to deliver gaseous fuel to the at least one cylinder; a variable valve timing actuation system to adjust an opening and/or closing timing of the intake valve; and a controller. The controller is configured to responsive to a ratio of gaseous fuel to liquid fuel reaching a first threshold ratio, adjust the variable valve timing actuation system to close the intake valve at a first timing prior to a piston of the at least one cylinder reaching a bottom dead center (BDC) position at an end of an intake stroke; responsive to the ratio dropping below the first threshold ratio but still above a second threshold ratio, adjust the variable valve timing actuation system to close the intake valve at a second timing, later than the first timing; and responsive to the ratio reaching the second threshold ratio, adjust the variable valve timing actuation system to close the intake valve at a third timing, earlier than the second timing and later than the first timing.

In an example, the second threshold ratio is zero gaseous fuel, and the controller is configured to adjust the ratio to reach the second threshold ratio responsive to engine load exceeding a load threshold. In an example, the second timing is at BDC. In an example, the controller is configured to adjust the ratio to be below the first threshold ratio and above the second threshold ratio responsive to an indication of auto-ignition in the at least one cylinder. In an example, the controller is configured to adjust the ratio to be below the first threshold ratio and above the second threshold ratio responsive to intake manifold temperature exceeding a threshold temperature.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   an engine having at least one cylinder controlled via an intake valve;
   a first fuel system to deliver liquid fuel to the at least one cylinder;
   a second fuel system to deliver gaseous fuel to the at least one cylinder;
   a variable valve timing actuation system to adjust at least one of an opening or a closing timing of the intake valve; and
   a controller configured to:
      during a liquid fuel only mode where only liquid fuel is delivered to the at least one cylinder, adjust the variable valve timing actuation system to close the intake valve at a first timing based at least on engine load; and
      during a multi-fuel mode where both liquid fuel and gaseous fuel are delivered to the at least one cylinder, adjust the variable valve timing actuation system to close the intake valve at a second timing, different than the first timing.

2. The system of claim 1, wherein the controller stores instructions in memory executable to:
   during the liquid fuel only mode and at a first engine speed and engine load point, adjust the variable valve timing actuation system to close the intake valve at the first timing, and
   during the multi-fuel mode and at the first engine speed and engine load point, adjust the variable valve timing actuation system to close the intake valve at the second timing, and the second timing is earlier than the first timing.

3. The system of claim 1, wherein the controller stores instructions in memory executable to adjust the variable valve timing actuation system to close the intake valve at the first timing based at least on engine load and further based on one or more of peak cylinder pressure, ambient pressure, ambient temperature, exhaust gas temperature, or intake oxygen concentration.

4. The system of claim 1, wherein the controller stores instructions in memory executable to, during the liquid fuel only mode, close the intake valve earlier at higher engine loads and later at lower engine loads.

5. The system of claim 1, wherein the controller stores instructions in memory executable to, only at engine loads above a threshold load, adjust the variable valve timing actuation system to close the intake valve at the second timing that is earlier than the first timing.

6. The system of claim 1, wherein the second fuel system comprises at least one gas admission valve to control delivery of the gaseous fuel to the at least one cylinder, and where the at least one gas admission valve has a linear delivery operating region and a non-linear delivery operating region.

7. The system of claim 6, wherein the controller is further configured to, when operating in the multi-fuel mode, operate the at least one gas admission valve in the non-linear delivery operating region when engine output is less than a threshold output.

8. The system of claim 6, wherein the controller is further configured to:
   when operating in the multi-fuel mode with the at least one gas admission valve in the linear delivery operating region, determine an open duration for the at least one gas admission valve according to a gas mass equation in order to supply a designated amount of gaseous fuel to the at least one cylinder; and
   when operating in the multi-fuel mode with the at least one gas admission valve in the non-linear delivery operating region, determine an open duration for the at least one gas admission valve according to a three-dimensional table in order to supply a designated amount of gaseous fuel to the at least one cylinder, the three-dimensional table specifying the open duration for the designated amount of gaseous fuel as a function of gaseous fuel density and a pressure ratio across the at least one gas admission valve.

9. The system of claim 6, wherein the controller is further configured to:
   when operating in the multi-fuel mode with the at least one gas admission valve in the linear delivery operating region, determine an open duration for the at least one gas admission valve according to a gas mass equation including a constant gas flow coefficient in order to supply a designated amount of gaseous fuel to the at least one cylinder; and
   when operating in the multi-fuel mode with the at least one gas admission valve in the non-linear delivery operating region, determine an open duration for the at least one gas admission valve according to an adjusted gas mass equation including a variable gas flow coefficient in order to supply a designated amount of gaseous fuel to the at least one cylinder.

10. The system of claim 6, wherein the at least one cylinder is one of a plurality of cylinders, each cylinder supplied with gaseous fuel via a respective gas admission valve of a plurality of gas admission valves, and wherein the controller is further configured to, when operating in the multi-fuel mode and when engine output is less than a threshold output, provide gaseous and liquid fuel to only a subset of the plurality of cylinders to maintain each active gas admission valve in the linear delivery operating region.

11. A system, comprising:
   an engine having at least one cylinder controlled via an intake valve;
   a first fuel system to deliver liquid fuel to the at least one cylinder;

a second fuel system to deliver gaseous fuel to the at least one cylinder;
a variable valve timing actuation system to adjust an opening and/or closing timing of the intake valve; and
a controller configured to:
responsive to a ratio of gaseous fuel to liquid fuel reaching a first threshold ratio, adjust the variable valve timing actuation system to close the intake valve at a first timing prior to a piston of the at least one cylinder reaching a bottom dead center (BDC) position at an end of an intake stroke, further adjust the variable valve timing actuation system based on engine load;
responsive to the ratio dropping below the first threshold ratio but still above a second threshold ratio, adjust the variable valve timing actuation system to close the intake valve at a second timing, later than the first timing; and
responsive to the ratio reaching the second threshold ratio, adjust the variable valve timing actuation system to close the intake valve at a third timing, earlier than the second timing and later than the first timing.

12. The system of claim 11, wherein the second threshold ratio is zero gaseous fuel, and wherein the controller is configured to adjust the ratio to reach the second threshold ratio responsive to engine load exceeding a load threshold.

13. The system of claim 11, wherein the second timing is at BDC, wherein the first threshold ratio is a maximum substitution ratio with standard valve timing control, and wherein responsive to adjusting the variable valve timing actuation system to close the intake valve at the first timing, the controller is configured to increase the ratio above the maximum substitution ratio.

14. The system of claim 11, wherein the controller is configured to adjust the ratio to be below the first threshold ratio and above the second threshold ratio responsive to an indication of auto-ignition in the at least one cylinder.

15. The system of claim 11, wherein the controller is configured to adjust the ratio to be below the first threshold ratio and above the second threshold ratio responsive to intake manifold temperature exceeding a threshold temperature.

16. A method comprising:
with a controller, during a liquid fuel only mode where only liquid fuel is delivered to at least one cylinder of an engine, the at least one cylinder controlled via an intake valve, adjusting a variable valve timing actuation system to close the intake valve at a first timing based at least on engine load, the engine having a first fuel system to deliver liquid fuel to the at least one cylinder, a second fuel system to deliver gaseous fuel to the at least one cylinder, and the variable valve timing actuation system that is configured to adjust at least one of an opening or a closing timing of the intake valve; and
with the controller, during a multi-fuel mode where both liquid fuel and gaseous fuel are delivered to the at least one cylinder, adjusting the variable valve timing actuation system to close the intake valve at a second timing, different than the first timing.

17. The method of claim 16, wherein adjusting the variable valve timing actuation system to close the intake valve at the first timing based at least on engine load comprises adjusting the variable valve timing actuation system to close the intake valve at the first timing during a first engine speed and engine load point, and wherein adjusting the variable valve timing actuation system to close the intake valve at the first timing comprises adjusting the variable valve timing actuation system to close the intake valve at the second timing at the first engine speed and engine load point, and the second timing is earlier than the first timing.

18. The method of claim 16, wherein adjusting the variable valve timing actuation system to close the intake valve at the first timing based at least on engine load comprises adjusting the variable valve timing actuation system to close the intake valve at the first timing based on engine load and further based on one or more of peak cylinder pressure, ambient pressure, ambient temperature, exhaust gas temperature, or intake oxygen concentration.

19. The method of claim 16, wherein the second timing is earlier than the first timing only at engine loads above a threshold load.

20. The method of claim 16, wherein the second fuel system comprises at least one gas admission valve to control delivery of the gaseous fuel to the at least one cylinder, and where the at least one gas admission valve has a linear delivery operating region and a non-linear delivery operating region, and the method further comprises, with the controller and when operating in the multi-fuel mode, operating the at least one gas admission valve in the non-linear delivery operating region when engine output is less than a threshold output.

* * * * *